US011910177B2

(12) United States Patent
Tracey

(10) Patent No.: US 11,910,177 B2
(45) Date of Patent: Feb. 20, 2024

(54) OBJECT-BASED AUDIO CONVERSION

(71) Applicant: Bose Corporation, Framingham, MA (US)

(72) Inventor: James Tracey, Norfolk, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 17/575,449

(22) Filed: Jan. 13, 2022

(65) Prior Publication Data

US 2023/0224660 A1 Jul. 13, 2023

(51) Int. Cl.
*H04R 5/02* (2006.01)
*H04S 7/00* (2006.01)
*H04R 5/04* (2006.01)

(52) U.S. Cl.
CPC ................ *H04S 7/30* (2013.01); *H04R 5/04* (2013.01); *H04S 2400/11* (2013.01)

(58) Field of Classification Search
CPC .......... H04S 7/30; H04S 2400/11; H04R 5/04
USPC ................................................. 381/300, 303
See application file for complete search history.

(56) References Cited

U.S. PATENT DOCUMENTS

2012/0314875 A1 12/2012 Lee et al.
2020/0058311 A1* 2/2020 Goodwin .............. G10L 19/008
2020/0168235 A1* 5/2020 Bernard .................... H04S 5/02

FOREIGN PATENT DOCUMENTS

EP 2645749 A2 10/2013
WO 2014/035902 A2 3/2014

OTHER PUBLICATIONS

International Search Report and Written Opinion of the International Searching Authority, dated Apr. 18, 2023 for related PCT/US2023/010687.

* cited by examiner

*Primary Examiner* — Ammar T Hamid
(74) *Attorney, Agent, or Firm* — BOSE CORPORATION

(57) ABSTRACT

An audio system that is configured to convert a plurality of audio input channels to object-based audio, and a related computer program product. Correlation between input channels and energy balance between the input channels are determined. The determined correlation and energy balance are mapped to output three-dimensional spatial locations.

20 Claims, 5 Drawing Sheets

OBJECT-BASED AUDIO CONVERSION

BACKGROUND

This disclosure relates to object-based audio conversion.

Up-mixing of input audio channels to a greater number of output channels traditionally has relied on a fixed N→M mapping. The spatial configuration of the M output channels is typically pre-defined (e.g. 5.1, 7.1). The introduction of object-based audio for linear content has de-coupled the playback environment with the mixing process. Audio content can now be mixed to spatial locations as opposed to specific channel arrangements. The concept of object-based mixing and rendering has not carried over to process of N→M blind up-mixing. In order for non-object-based audio content to be rendered using state of the art spatial rendering techniques the up-mixing needs to infer spatial location from input signal statistics.

SUMMARY

Aspects and examples are directed to conversion of channel-based audio to object-based audio whereby non-object-based input audio is mapped to spatial locations instead of panning coefficients. The input audio can then be rendered to any arbitrary loudspeaker configuration using spatial rendering techniques. A result is that the renderer can handle both object-based and non-object-based inputs, and so is able to produce more immersive sound even from traditional non-object-based input channels.

All examples and features mentioned below can be combined in any technically possible way.

In one aspect, a computer program product having a non-transitory computer-readable medium including computer program logic encoded thereon that, when executed, is configured to convert a plurality of audio input channels to object-based audio, includes determining correlation between input channels, determining energy balance between the input channels, and mapping the determined correlation and energy balance to output three-dimensional spatial locations.

Some examples include one of the above and/or below features, or any combination thereof. In an example the spatial locations are defined by cartesian coordinates for three-dimensional space. In an example the cartesian coordinates define a hemispherical surface. In an example the cartesian coordinates comprise determined correlations, determined energy balances, and heights. In an example values of determined correlation and determined energy balance define a height of a mapped spatial location.

Some examples include one of the above and/or below features, or any combination thereof. In some examples the computer program logic is further configured to use the output three-dimensional spatial locations to develop a plurality of output channels. In an example there are a greater number of output channels than there are input channels. In an example the computer program logic further comprises a spatial audio rendering technique. In an example the output channels comprise at least one height channel. In an example the output channels comprise a left height channel and a right height channel. In an example the output channels comprise a left front height channel, a right front height channel, a left back height channel, and a right back height channel.

In another aspect an audio system that is configured to receive input audio channels includes multiple loudspeakers spaced about a listening area and a processor that is configured to determine correlation between input channels and energy balance between the input channels, and map the determined correlation and energy balance to output three-dimensional spatial locations.

Some examples include one of the above and/or below features, or any combination thereof. In some examples the spatial locations are defined by cartesian coordinates for three-dimensional space. In an example the cartesian coordinates define a hemispherical surface. In an example the cartesian coordinates comprise determined correlations, determined energy balances, and heights. In an example values of determined correlation and determined energy balance define a height of a mapped spatial location.

Some examples include one of the above and/or below features, or any combination thereof. In some examples the processor further uses the output three-dimensional spatial locations to develop a plurality of output channels. In an example there are a greater number of output channels than there are input channels. In an example the processor is further configured to accomplish a spatial audio rendering technique. In an example the output channels comprise at least one height channel.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples and are incorporated in and constitute a part of this specification but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1:
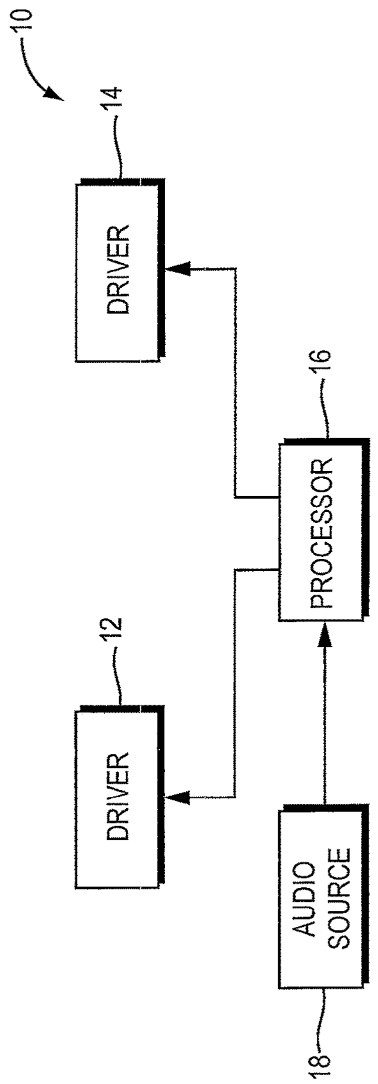
FIG. 1 is schematic diagram of an audio system that is configured to accomplish conversion of channel-based audio to object-based audio.

As is well known in the audio field, surround sound audio systems can have multiple channels (often, 5 or 7 channels, or more) that are more or less arranged in a horizontal plane in front of, to the side of, and behind the listener. The system can also have multiple height channels (often, 2 or 4, or more) that are arranged to provide sound from above the listener. Finally, the system can have one or more low frequency channels. As an example, a 5.1.4 system will have 5 channels in the horizontal plane, 1 low-frequency channel, and 4 height channels.

Object-based surround sound technologies (e.g., Dolby Atmos and DTS:X) include a large number of tracks plus associated spatial audio description metadata (e.g., location data). Each audio track can be assigned to an audio channel or to an audio object. Surround sound systems for object-based audio may have more channels than a typical residential 5.1 system. For example, object-based systems may have ten channels, including multiple overhead speakers, in order to accomplish 3-D location virtualization. During playback the surround-sound system renders the audio objects in real-time such that each sound is coming from its designated spot with respect to the loudspeakers.

Legacy audio sources often include only two channels—left and right, or perhaps additional channels, but no height channels. Such sources do not have the information that allows height channels to be developed by many sound technologies. Accordingly, the listener cannot enjoy the full immersive surround sound experience from legacy audio sources.

A process whereby height channels are developed from non-object-based audio is disclosed in U.S. patent application Ser. No. 17/088,062, filed on Nov. 3, 2020, the entire disclosure of which is incorporated herein by reference for all purposes. In the process disclosed in this patent application panning coefficients are developed from correlations between input channels and their energy content. The panning coefficients can be used by a non-object-based renderer to develop height signals that can be reproduced by height loudspeakers.

The present disclosure comprises an audio converter that is configured to develop three-dimensional spatial locations from audio that is not explicitly encoded with spatial metadata, such as non-object-based audio. A result is that the audio can be rendered by an object-based renderer. An audio system that includes the subject audio conversion can thus handle both object-based and non-object-based input audio. Further, the present audio conversion allows a listener to enjoy a more immersive audio experience than is otherwise available in a non-object-based input. The audio conversion involves determining correlations and normalized channel energies between input audio channels, and mapping them to spatial locations. In some examples the spatial locations are defined by a set of three-dimensional cartesian coordinates. In an example the three-dimensional cartesian coordinates define a hemispherical surface.

Audio system 10, FIG. 1, is configured to be used to develop and reproduce these three-dimensional mapped coordinates. The input audio can then be rendered to any arbitrary loudspeaker configuration using any known spatial audio rendering technique. System 10 is configured to accomplish such three-dimensional mapping of non-object-based input audio content provided to system 10 by audio source 18. In some examples, audio source 18 provides left and right channel (i.e., stereo) audio signals. Audio system 10 includes processor 16 that receives the audio signals, processes them as described elsewhere herein, and distributes processed audio signals to some or all of the audio drivers that are used to reproduce the audio. Exemplary, non-limiting drivers 12 and 14 are illustrated. In many examples there will be more than two drivers/speakers located about a listening area, such as the drivers that are part of the Sony HTA9 system that is configured to render and reproduce object-based audio using multiple speakers. In other examples the drivers are part of a soundbar. Soundbars are often designed to be used to produce sound for television systems. Soundbars may include two, or more, drivers. Soundbars are well known in the audio field and so are not fully described herein. In an example the output signals from processor 16 define a 5.0.4 audio system with five horizontal channels (center, left, right, left surround, and right surround), and four height channels, such as left front height, right front height, left back height, and right back height channels. In an example the height channels are reproduced with either up-firing drivers that reflect sound off the ceiling and/or drivers located in the ceiling or elsewhere above the nominal height of a listener.

Processor 16 includes a non-transitory computer-readable medium that has computer program logic encoded thereon that is configured to determine correlations between input channels (from audio signals provided by audio source 18), determine energy balances among input channels, and map the determined correlations and energy balances to output three-dimensional spatial locations. Development of object-based signals that are mapped to three-dimensional space from input audio signals that do not contain height-related information (e.g., height objects or height encoding) is described in more detail elsewhere herein.

Figure 2:
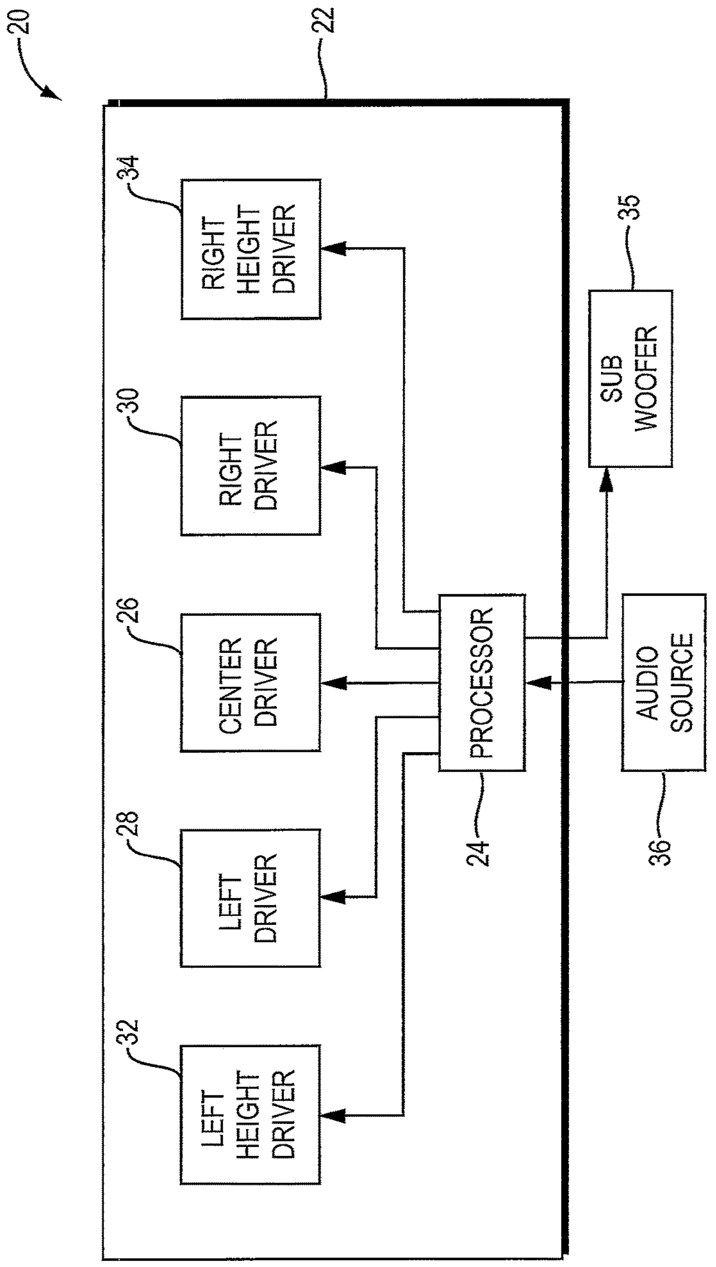
FIG. 2 is schematic diagram of a surround sound audio system that is configured to accomplish conversion of channel-based audio to object-based audio.

Soundbar audio system 20, FIG. 2, includes soundbar enclosure 22 that includes center channel driver 26, left front channel driver 28, right front channel driver 30, and left and right height channel drivers 32 and 34, respectively. In many but not all cases drivers 26, 28, and 30 are oriented such that their major radiating axes are generally horizontal and pointed outwardly from enclosure 22, e.g., directly toward and to the left and right of an expected location of a listener, respectively, while drivers 32 and 34 are pointed up so that their radiation will bounce off the ceiling and, from the listener's perspective, appear to emanate from the ceiling. Soundbar audio system 20 also includes subwoofer 35 that is typically not included in enclosure 22 but is located elsewhere in the room and is configured to reproduce the LFE channel. The soundbar thus accomplishes a 3.1.2 speaker configuration. Soundbar audio system 20 includes processor 24 (e.g., a digital signal processor (DSP)) that is configured to process input audio signals received from audio source 36. Note that in most cases the input audio signals would be received by signal reception and processing components that are not shown in FIG. 2 (for the sake of ease of illustration) and that provide the input signals to processor 24. Processor 24 is configured (via programming) to perform the functions described herein that result in the provision of object-based audio data from non-object-based input. Note also that the present disclosure is not in any way limited to use with a soundbar audio system, or any particular loudspeaker configuration, but rather can be used with other audio systems that include audio drivers that can be used to reproduce audio signals that are mapped to three-dimensional locations.

In some examples input non-object based audio is processed as follows in order to develop the mapped three-dimensional audio data. Correlations between input channels (expressed in some examples as a "correlation value" that ranges from −1 to +1), and the energy balance between input channels (expressed in some examples as a "normalized energy" or "panning state", where values range from −1 to +1), are calculated as follows. Additional details regarding the correlation values and panning states are described in the patent application that is incorporated by reference herein.

In examples described herein height-channel audio conversion is used to synthesize height components from audio signals that do not include height components. The synthesized height components can be used in one or more channels of an audio system. In some examples the height components are used to develop left height and right height channels from input stereo or traditional non-object-based surround sound content. In some examples the synthesized height components are used to develop left front height, right front height, left rear height, and right rear height channels from input channel-based audio (e.g., stereo or traditional surround sound content). The synthesized height components can be used in other manners, as would be apparent to one skilled in the technical field.

In some implementations, the height channel audio conversion techniques described herein can be used in addition to or as an alternative to other three-dimensional or object-based surround sound technologies (such as Dolby Atmos and DTS:X). Specifically, the height channel audio conversion techniques described herein can provide a similar height (or vertical axis) experience that is provided by three-dimensional or object-based surround sound technologies, even when the content is not encoded as such. For example, the height channel audio conversion techniques can add a height component to stereo sound to more fully immerse a listener in the audio content. In addition, the channel audio conversion techniques can be used to allow a soundbar that includes one or more upward firing drivers (or relatively upward firing drivers, such as those that are angled more toward the ceiling than horizontal, such as greater than 45 degrees relative to the soundbar's main plane) to add or increase a height component of the sound even where the content does not include a height component or the height-component containing content cannot otherwise be adequately decoded/rendered. For example, many soundbars use a single HDMI eARC connection to televisions to receive and play back audio content that includes a height component (such as Dolby Atmos or DTS:X content), but for televisions that do not support HDMI eARC, such audio content may not be able to be passed from the television to the soundbar, regardless of whether the television can receive the audio content. Thus, the height channel audio conversion techniques described herein can be used to address such issues.

Figure 3:
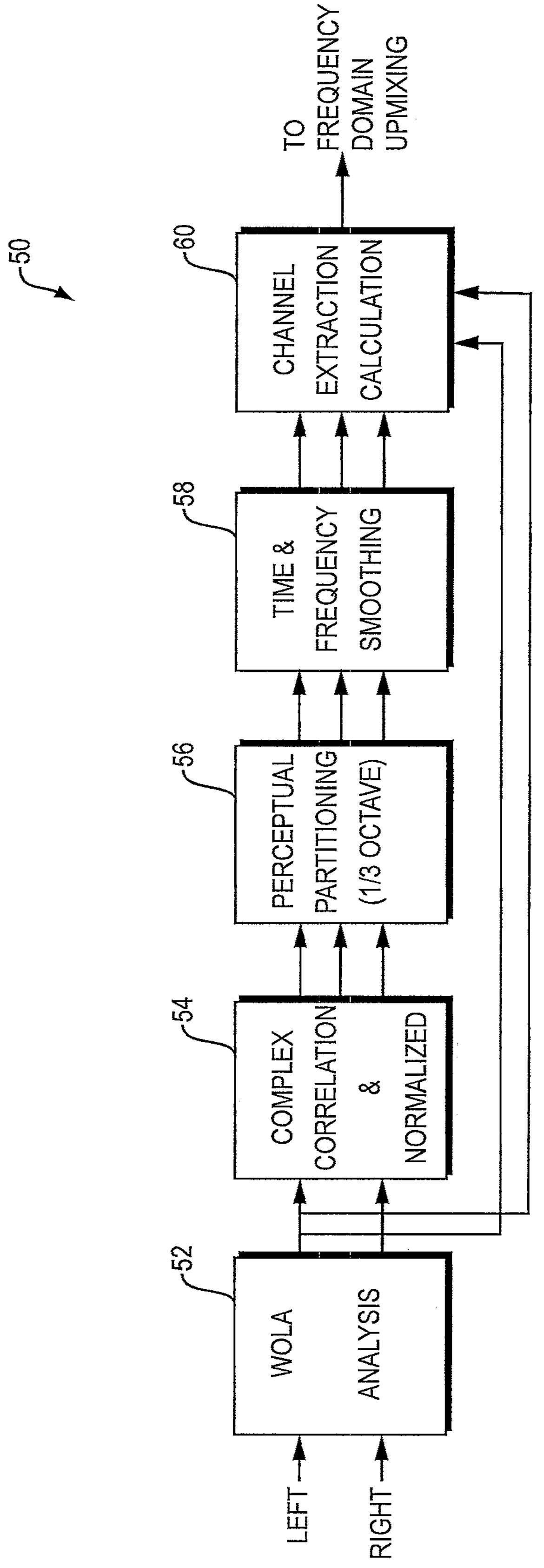
FIG. 3 is schematic diagram of aspects of an audio converter that develops height channels from input stereo signals.

FIG. 3 is schematic diagram of aspects of an exemplary frequency-domain audio converter 50 that is configured to develop up to four height channels from input left and right stereo signals. In an example audio converter 50 is accomplished with a programmed processor, such as processor 24, FIG. 2. In WOLA Analysis 52, the incoming signals are processed using a weight, overlap, add discrete-time fast Fourier transform that is useful to analyze samples of a continuous function. Blocks of audio data (which in an example include 2048 samples) that serve as the inputs to the WOLA may be referred to as frames. WOLA analysis techniques are well known in the field and so are not further described herein. The outputs are resolved discrete frequencies or bins that map to input frequencies. The transformed signals are then provided to both the complex correlation and normalization function 54 and the channel extraction calculation function 60.

In complex correlation and normalization 54, correlation is performed on each FFT bin using the following approach: Consider each FFT bin for left and right channels to be a vector in the complex plane. The scalar projection of one vector onto the other is then computed using the expression Dot(Left, Right)/(mag(Left)*mag(Right)), Where mag(a) =Sqrt(Real(a)^2+Imag(a)^2). This results in a range of correlation values from −1 for negative correlation and +1 for positive correlation. Normalized Energy is calculated on each FFT bin using the following approach: Left channel Normalized Energy=mag(Left)/(mag(Left)+mag(Right)). Right channel Normalized Energy=mag(Right)/(mag(Left)+ mag(Right)). This results in a range of 0.5 for equal energy and 1.0 or 0.0 for hard panned cases.

In perceptual partitioning 56, FFT bins are partitioned using sub-octave spacing (e.g., ⅓ octave spacing) and the correlation and energy values are calculated for each partition. Each partition's correlation value and energy are subsequently used to calculate maps for each synthesized channel output. Other perceptually-based partitioning schemes may be used based on available processing resources. In an example the partitioning is effective to reduce 1024 bins to 24 unique values or bands.

In time and frequency smoothing 58, each partition band is exponentially smoothed on both the time and frequency axis using the following approaches. For time smoothing each partition's correlation and normalized energy is calculated using the expression: Psmoothed(i, n)=(1−alpha)*Punsmoothed(n)+alpha*Psmoothed(i, n−1), where alpha can have values between 0:1 and Psmoothed(i, n−1) represents the previous FFT frames result for the ith partition. For frequency smoothing each partition's correlation value is smoothing by a weighted average of its nearest neighbors. The closer to the current partition the larger the weight as such, Waverage(i)=Sum(Punsmoothed(j)/abs(j−i)), for all j where j !=I, then the final weighted average is Psmoothed (i)=(Waverage(i)+Punsmoothed(i))/(1.0+Sum(1.0/(abs(j−i))). This helps to eliminate the musical noise artifact which is sometimes present in frequency domain implementations.

In channel extraction calculation 60, channels are extracted for each partition on an energy-preserving basis as a function of both correlation and normalized channel energy. For hard panned content there is steering to ensure original panning is preserved; this is necessary since hard panned content will have correlation=0.0. The outputs of calculation 60 are processed through standard data formatting, WOLA synthesis and bass management techniques (not shown) to create a 5.1.4 channel output that includes left front height, right front height, left rear height, and right rear height channels. The four height channel signals can be provided to appropriate drivers, such as left and right height drivers of a soundbar, or dedicated height drivers. In some examples there are two height channels (left and right) and in other examples there are more than four height channels.

In an example input left and right audio signals are audio conversion by the audio system processor to create a 5.1.4 channel output. The five horizontal channels include left and right front, center, and left and right surround channels. The four height channels include left and right front height and left and right back height channels. Left, center, and right channels can be developed by determining an inter-aural correlation coefficient between −1.0 and 1.0 and determining left and right normalized energy values, as described above relative to complex correlation and normalization function 52. The center channel signal is determined based on a center channel coefficient multiplied separately with each of the left and right channel inputs. The center channel coefficient has a value greater than zero if the inter-aural correlation coefficient is greater than zero, else it is zero. The left and right channel signals are based on the energy that is not used in the center channel. In cases where the input is hard panned to the left or right the energy is kept in the appropriate input channel.

In an example these left and right channel signals are further divided into left and right front, left and right surround, left and right front height, and left and right back height signals. These divisions are based on the inter-aural correlation coefficient and the degree to which inputs are panned left or right. If the inter-aural correlation coefficient is greater than 0.5, no content is steered to the height or surround channels. Otherwise, front, front height, surround, and back height coefficients are determined based on the value of the inter-aural correlation coefficient and the degree of left or right panning. The front coefficient is used to determine new left and right channel output signal. The left and right front height signals are based on these new left and right channel output signals multiplied by their respective front height coefficients, while the left and right back height signals are based on these new left and right channel output signals multiplied by their respective back height coefficients. The left and right surround signals are based on these new left and right channel output signals multiplied by their respective surround coefficients. The new left and right channel output signals are blended with the original left and right input signals, as modified by the degree of panning, to develop the left and right channels.

The calculated correlation values and panning states are mapped to spatial locations. In some examples the spatial locations are defined by a three-dimensional set of cartesian coordinates, which may be termed x, y, and z. The coordinates define a hemispherical surface of radius=R=1 that is defined by the following equation (1):

$$z=\sqrt{1-x^2-y^2} \quad (1)$$

Figure 4:
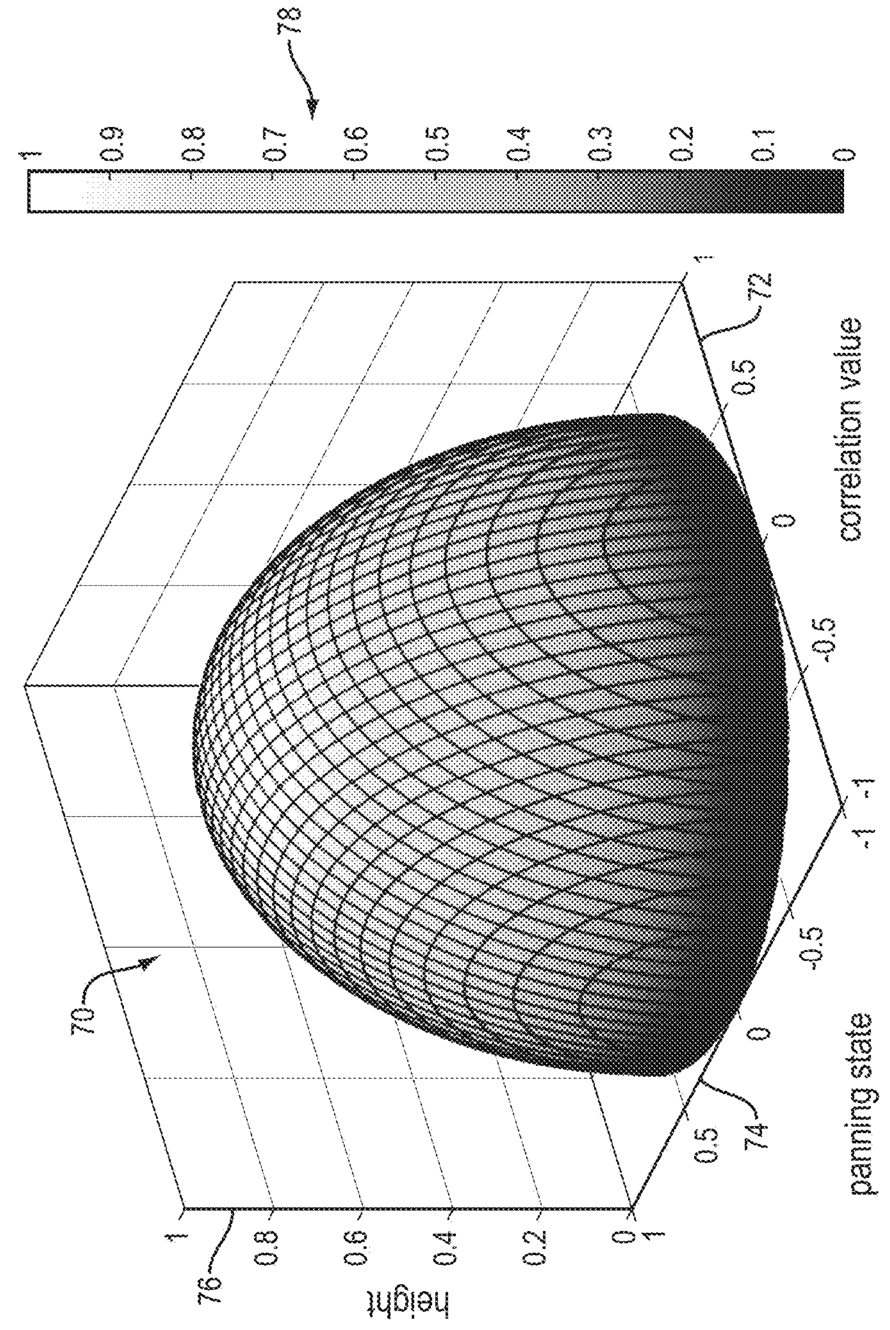
FIG. 4 illustrates a mapping of correlation values and panning states to cartesian coordinates.

An exemplary hemispherical surface 70 is illustrated in FIG. 4, wherein the panning state 74 and correlation value 72 are plotted on the x and y axes, and the height 76 is on the z axis. Scale 78 represents the height (along the z axis) of points on surface 70 above the x-y plane. FIG. 4 illustrates this exemplary mapping of the correlation value and panning state to a spatial location in x, y, and z coordinates. The defined spatial coordinates comprise spatially encoded metadata that can be used, together with knowledge of the local speaker configuration and the input audio, by a spatial audio rendering technique such as accomplished by an object-based renderer that can be encoded in processor 16, FIG. 1.

The described audio conversion techniques are agnostic to the object-based renderer used and to the quantity of speakers and the speaker layout. Using the described techniques allows the input audio to be converted to object-based audio that can be locally rendered to any arbitrary speaker configuration using a state-of-the-art spatial rendering technique, such as Vector Based Amplitude Panning (VBAP), Distance Based Amplitude Panning (DBAP), or Higher Order Ambisonics (HOA). These are several examples of spatial audio rendering techniques but are not limitations of the disclosure, as other now existing or future-develop spatial audio rendering techniques can be used. Also, an audio system that is configured to accomplish the described techniques can include a single renderer that is able to handle both object-based and non-object-based (e.g., stereo) input, which simplifies the audio system and makes an audio system more universally compatible with the different types of input audio. Also, if the renderer is improved over time there is no need to remix the audio. Instead, the rendering can be accommodated by simply updating with the speaker locations. Further, speakers can be added to an audio system without needing to re-mix the audio, again as long as speaker locations are updated. The manners in which the spatial location metadata are utilized in object-based renderers is known in the field and so is not further described herein.

Figure 5A:
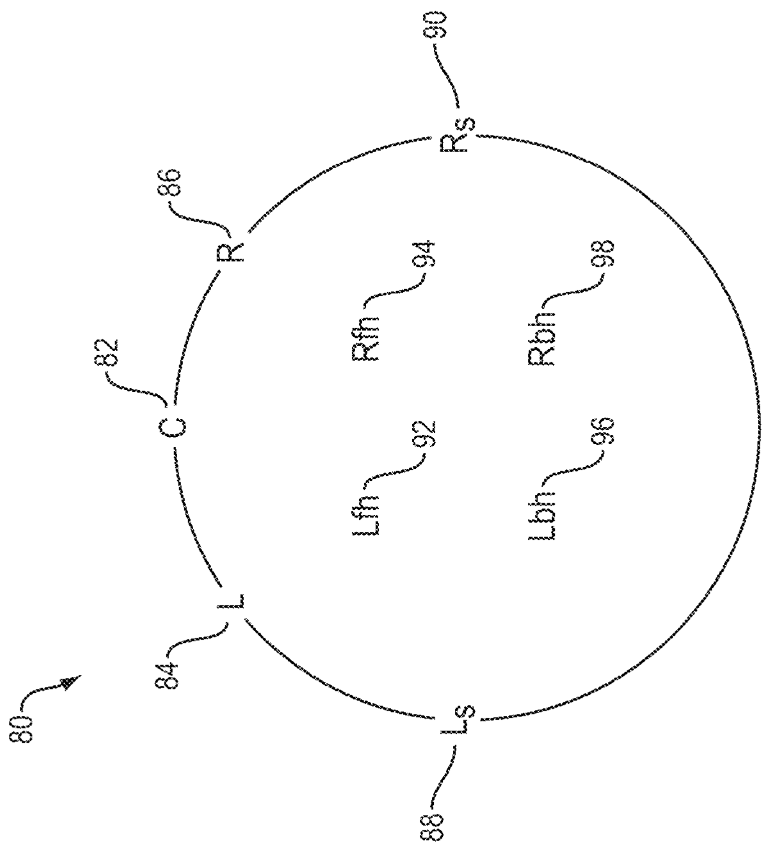
FIG. 5A is a representation of a gain map for a representative speaker configuration.

FIG. 5A is a representation of an overall gain map 80 for a representative 5.0.4 speaker configuration that includes center (C) speaker 82, left (L) speaker 84, right (R) speaker 86, left surround (Ls) speaker 88, right surround (Rs) speaker 90, left front height (Lfh) speaker 92, right front height (Rfh) speaker 94, left back height (Lbh) speaker 96, and right back height (Rbh) speaker 98. Gain map 80 may be considered to be a top view of a hemisphere that represents the height above the x-y plane, as shown for example by hemisphere 70, FIG. 4.

Figure 5B:
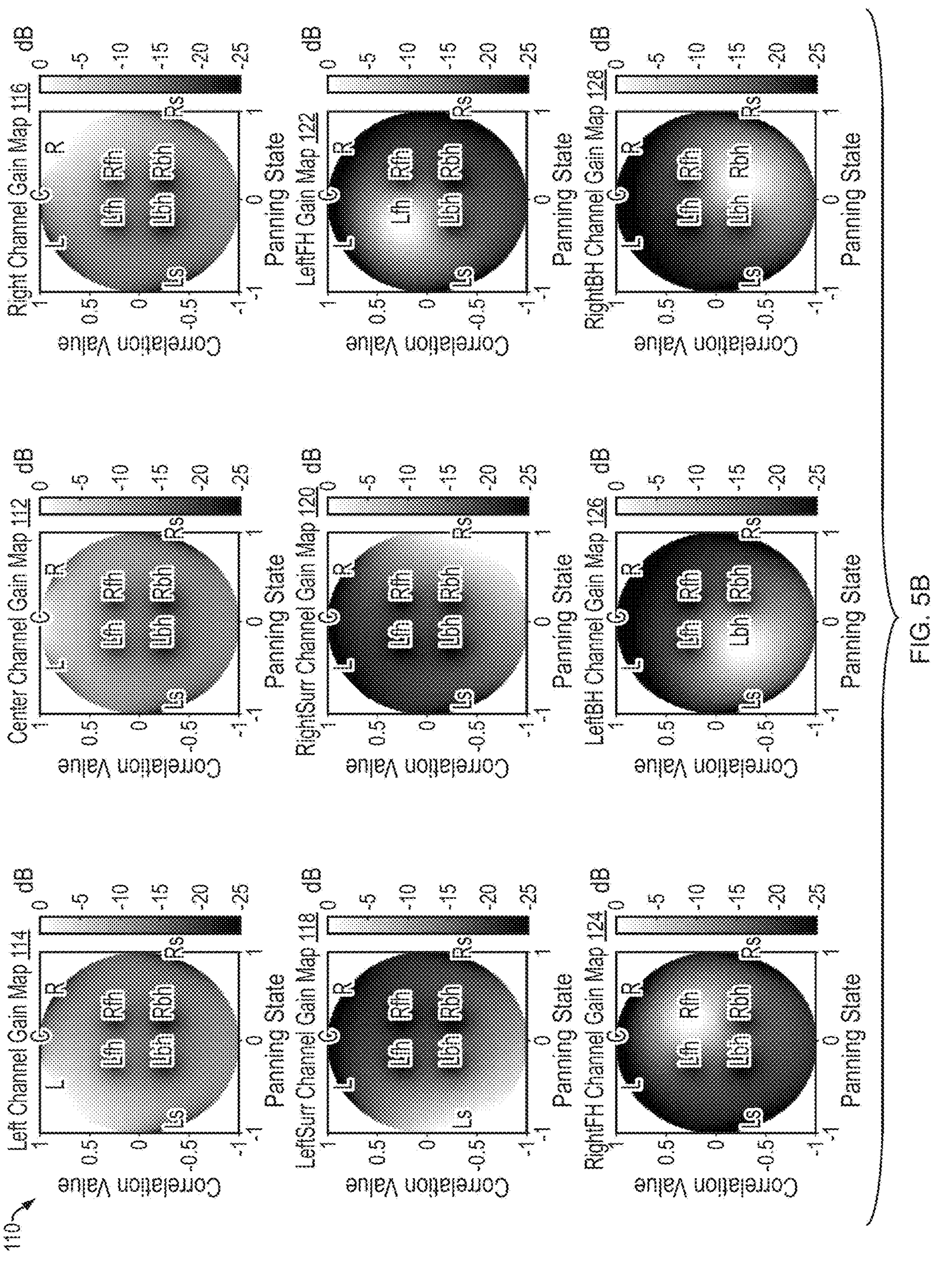
FIG. 5B illustrates gain maps for an object-based output from a non-object-based input.

FIG. 5B illustrates set 110 that includes gain maps 112 (center channel), 114 (left channel), 116 (right channel), 118 (left surround channel), 120 (right surround channel), 122 (left front height channel), 124 (right front height channel), 126 (left back height channel), and 128 (right back height channel) for an object-based up-mixed input to the 5.0.4 speaker configuration mapped in FIG. 5A. In this non-limiting example a distance-base amplitude-panning spatial rendering technique was used, to illustrate an exemplary up-mixing result. FIG. 5B is illustrative of the gain maps that result from various speaker configurations. The illustrated gain maps for a 5.0.4 speaker configuration is a standard 5.X surround layout with the addition of four overhead height channels. The gain maps can be understood by visualizing a sound source at any arbitrary location within the defined hemispherical surface. In order to localize that sound source, the contribution of every speaker in the local configuration is determined. Maps 112, 114. 116. 118, 120, 122, 124, 126, and 128 illustrate each channel's contribution in dB scale. The darker shades represent lower gain areas, and include areas where there is a speaker located. The gain will be low for a given speaker at any area where there is another speaker located. For example, for a sound source located very close to the left front height (Lfh) speaker there will very little contribution from the other speakers needed to localize that source to that location. With the obvious exception of the Lfh speaker itself which shows a gain close to or equal to 0 dB.

The present object-based audio conversion effectively future-proofs audio conversion technologies since a rendering technology can be upgraded as more advanced approaches are developed. In addition, it offers the listener a more immersive, and less sweet-spot dependent, experience as compared to the non-object-based input audio.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Elements of some figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise processor/computer-implemented steps that will be apparent to those skilled in the art. For example, it should be understood by one of skill in the art that the computer-implemented steps may be stored as computer-executable instructions on a computer-readable medium such as, for example, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a processor system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), micro-controller (s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converters) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A computer program product having a non-transitory computer-readable medium including computer program logic encoded thereon that, when executed, is configured to convert a plurality of audio input channels with audio that is not explicitly encoded with spatial metadata to object-based audio that includes three-dimensional spatial locations, the computer program product comprising:

determining a correlation between the audio of the plurality of input channels that is not explicitly encoded with spatial metadata;

determining energy balance between the audio of the plurality of input channels that is not explicitly encoded with spatial metadata; and mapping the determined correlation and energy balance to output audio that includes three-dimensional spatial locations.

2. The computer program product of claim 1 wherein the three-dimensional spatial locations are defined by cartesian coordinates for three-dimensional space.

3. The computer program product of claim 2 wherein the cartesian coordinates define a hemispherical surface.

4. The computer program product of claim 2 wherein the cartesian coordinates comprise determined correlations, determined energy balances, and heights.

5. The computer program product of claim 1 wherein values of the determined correlation and the determined energy balance define a height of a mapped three-dimensional spatial location.

6. The computer program product of claim 1 wherein when executed the computer program logic is further configured to use the three-dimensional spatial locations of the output audio to develop a plurality of output channels.

7. The computer program product of claim 6 wherein there are a greater number of output channels than there are input channels.

8. The computer program product of claim 6 wherein the computer program logic further comprises a spatial audio rendering technique.

9. The computer program product of claim 6 wherein the output channels comprise at least one height channel.

10. The computer program product of claim 9 wherein the output channels comprise a left height channel and a right height channel.

11. The computer program product of claim 9 wherein the output channels comprise a left front height channel, a right front height channel, a left back height channel, and a right back height channel.

12. An audio system that is configured to receive input audio channels with audio that is not explicitly encoded with spatial metadata, comprising:

multiple loudspeakers spaced about a listening area; and a processor that is configured to determine a correlation between the audio of the plurality of input channels that is not explicitly encoded with spatial metadata and energy balance between the audio of the plurality of input channels that is not explicitly encoded with spatial metadata, and map the determined correlation and energy balance to output audio that includes three-dimensional spatial locations.

13. The audio system of claim 12 wherein the three-dimensional spatial locations are defined by cartesian coordinates for three-dimensional space.

14. The audio system of claim 13 wherein the cartesian coordinates define a hemispherical surface.

15. The audio system of claim 13 wherein the cartesian coordinates comprise determined correlations, determined energy balances, and heights.

16. The audio system of claim 12 wherein values of the determined correlation and the determined energy balance define a height of a mapped three-dimensional spatial location.

17. The audio system of claim 12 wherein the processor further uses the three-dimensional spatial locations of the output audio to develop a plurality of output channels.

18. The audio system of claim 17 wherein there are a greater number of output channels than there are input channels.

19. The audio system of claim 17 wherein the processor is further configured to accomplish a spatial audio rendering technique.

20. The audio system of claim 17 wherein the output channels comprise at least one height channel.

* * * * *